(Model.)

J. H. BARLOW.
CARTRIDGE IMPLEMENT.

No. 364,747.   Patented June 14, 1887.

Witnesses:
James Connelly
W. E. Day

Inventor:
John H Barlow
By Louis S. Day
Atty.

UNITED STATES PATENT OFFICE.

JOHN H. BARLOW, OF NEW HAVEN, CONNECTICUT.

CARTRIDGE IMPLEMENT.

SPECIFICATION forming part of Letters Patent No. 364,747, dated June 14, 1887.

Application filed January 8, 1887. Serial No. 223,829. (Model.)

*To all whom it may concern:*

Be it known that I, JOHN H. BARLOW, a citizen of the United States, residing at New Haven, in the county of New Haven and State of Connecticut, have invented certain new and useful Improvements in Cartridge Implements, of which the following is a specification, reference being had therein to the accompanying drawings, in which—

Figure 1:
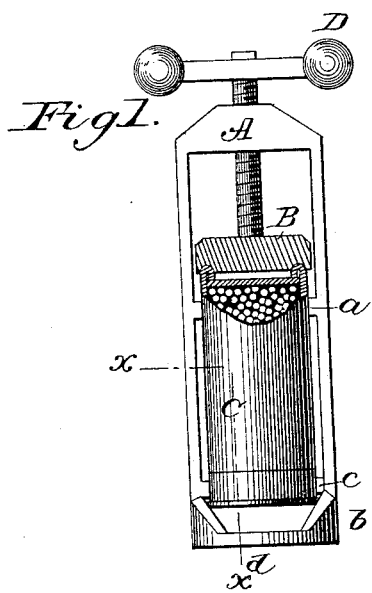
Figure 2:
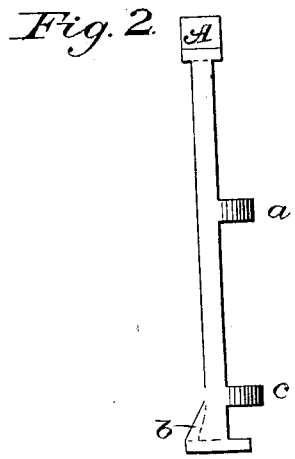
Figure 4:
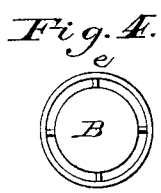
Figure 5:
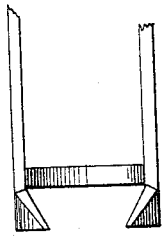
Figure 3:
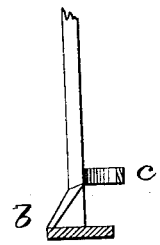

Figure 1 represents my cartridge implement complete, with a cartridge in position of being crimped. A portion of the cartridge, together with the crimping-burr, is shown in section to show the end of the shell turned inwardly upon the wad. Fig. 2 represents a side elevation of the frame A. Fig. 3 is a central sectional view of the lower part of the frame A on the line $x\ x$, Fig. 1. Fig. 4 is a plan of the crimping-burr. Fig. 5 represents a modification of the lower part of the frame A.

My invention relates to improvements in a tool or implement used for turning the ends of paper cartridges inwardly upon the charge contained therein.

It is necessary during the operation of turning the shell in (commonly known as "crimping") that the shell be held securely to prevent any rotation of the same; and therefore the object of my invention is to construct an implement that shall contain a new and novel device for securely holding the shell during the operation of crimping; and to this end it consists of the construction and arrangement of the parts hereinafter shown and described, and specified in the claim.

In the drawings, A represents the frame of the implement, and is of peculiar form of construction. It has the form of a semi-cylinder, whereby the cartridge may be entered into the implement from the open side instead of inserting at either end, as is commonly done in implements made heretofore. The two parallel sides have two semicircular cross-bars, $a$ and $c$, which connect them, while at the same time they afford a means of support for the cartridge C when it is being crimped. At the lower end of the sides are two cams, $b\ b$, projecting therefrom, with their gripping-edges converging to a center outside of a plane of the axis of the cartridge-shell C, as placed in the position shown in Fig. 1. The cams $b\ b$ are represented in Fig. 1 as being connected by the cross-bar $d$, and in the modified form of Fig. 5 the cross-bar $d$ is omitted, an omission which does not deteriorate the efficiency of the implement, while it might be preferable to adhere to the form of Figs. 1, 2, and 3. By the arrangement of the cams $b\ b$ and the semicircular cross-bar $c$, as herein shown, it will readily be seen that as the cartridge is forced against the cams $b\ b$, they being arranged to come in contact with the rim of the cartridge-shell C, the opposite side of the cartridge-shell is pressed firmly upon the inner surface of the semicircular cross-bar $c$, which then operates as a frictional band to assist in holding the said cartridge from rotating.

B represents a crimping-burr, being a circular piece of metal having an annular groove in its face, the said annular groove being provided with radial wings $e\ e\ e\ e$. The burr B is an old and common device used in crimping implements.

D is a T-levered screw attached to the crimping-burr B, and passes through an internally-threaded hole in the top of the frame A, as shown in Fig. 1.

The operation of the implement and functions of the parts included in my invention are as follows, viz: The screw D being run out so as to bring the burr B near the top of the frame A, the cartridge C, with its charge therein contained, is placed upon the semicircular cross-bars $a$ and $c$, with the rim of the head against the cams $b\ b$. Now, the turning of the screw D moves the burr B forward toward the open end of the cartridge-shell C, while at the same time it is being rotated. Now, if the shell C was allowed to rotate with the burr B, the forward movement of the same would not crimp the end of the shell C inwardly upon the wad, but would crush the same, and if further continued cause the shell C to break near the head; but owing to the peculiar form of construction of the end receiving the head of the shell C—that is, the cams $b\ b$ and semicircular cross-bar $c$—the shell is held firmly and rotation thereof prevented while the burr B is being rotated and advanced upon the open end of the shell C, thus enabling a true crimp to be made. The formation of the frame A with its cams $b\ b$ integral therewith, as also the cross-bars *a c*, is such that no labor is required to perfect them, after leaving the molding-sand in the foundry, thus making a very cheap and efficient device.

I am aware that the rotating of the burr B and advancing the same upon the cartridge-shell at one and the same time by means of the screw are not new. The same device was the subject of an application for Letters Patent, filed by H. E. Fowler and myself as joint inventors on March 18, 1886, Serial No. 195,644. The same device forms a part of Letters Patent granted to Wm. W. Christmas and Frank B. Jonas, December 25, 1883, No. 290,973. Therefore I do not now claim that as new; but What I do claim as new, and desire to secure by Letters Patent, is—

In an implement for crimping the ends of cartridge-shells inwardly upon the charge therein contained, the frame A, provided at one end with the cams *b b*, arranged to operate in conjunction with the semicircular cross-bar *c*, to form a gripping device to prevent the rotation of the cartridge-shell C, the rotary crimping-burr B, and the screw D, forcing the crimper-head longitudinally in the frame A, all in combination to operate substantially as shown and described.

In testimony whereof I affix my signature in presence of two witnesses.

JOHN H. BARLOW.

Witnesses:
HENRY J. MILLER,
LOUIS S. DAY.